(12) United States Patent
Kessler

(10) Patent No.: US 6,848,724 B2
(45) Date of Patent: Feb. 1, 2005

(54) THREAD DESIGN FOR UNIFORM DISTRIBUTION OF MAKEUP FORCES

(75) Inventor: Francois Dominique Andre Louis Kessler, Candresse (FR)

(73) Assignee: Grant Prideco, Inc., The Woodlands, TX (US)

( * ) Notice: Subject to any disclaimer, the term of this patent is extended or adjusted under 35 U.S.C. 154(b) by 70 days.

(21) Appl. No.: 10/217,129

(22) Filed: Aug. 12, 2002

(65) Prior Publication Data

US 2004/0026924 A1 Feb. 12, 2004

(51) Int. Cl.[7] ............................................. F16L 25/00
(52) U.S. Cl. ..................... 285/334; 285/333; 285/390
(58) Field of Search ................................. 285/333, 334, 285/355, 390

(56) References Cited

U.S. PATENT DOCUMENTS

| | | | |
|---|---|---|---|
| 1,870,380 A | | 8/1932 | Peters et al. |
| 3,050,318 A | | 8/1962 | Der Wissel |
| 3,205,756 A | | 9/1965 | Ollis Jr. et al. |
| 3,210,096 A | * | 10/1965 | Van Der Wissel .......... 285/334 |
| 4,346,920 A | | 8/1982 | Dailey |
| 4,549,754 A | | 10/1985 | Saunders et al. |
| 4,603,889 A | * | 8/1986 | Welsh ......................... 285/355 |
| 4,629,222 A | * | 12/1986 | Dearden et al. ............. 285/390 |
| 4,629,223 A | * | 12/1986 | Dearden et al. ............. 285/334 |
| 4,688,832 A | * | 8/1987 | Ortloff et al. ............... 285/390 |
| 4,842,464 A | | 6/1989 | Green |
| 5,462,315 A | | 10/1995 | Klementich |
| 5,788,401 A | | 8/1998 | Drenth |
| 5,931,511 A | | 8/1999 | DeLange et al. |
| 6,155,613 A | | 12/2000 | Quadflieg et al. |
| 6,467,818 B1 | * | 10/2002 | Snapp et al. ................ 285/334 |
| 6,585,299 B1 | * | 7/2003 | Quadflieg et al. .......... 285/333 |

* cited by examiner

Primary Examiner—David Bochns
Assistant Examiner—Aaron Dunwoody
(74) Attorney, Agent, or Firm—C. James Bushman; Browning Bushman P.C.

(57) ABSTRACT

A threaded pin and box pipe connection having makeup shoulders that contact when the pin and box threads are fully engaged. Upon initial engagement of the shoulders, load flanks of the pin and box threads furthest from the makeup shoulders engage each other and begin progressively separating from each other by an increasing amount along the length of the engaged threads in a direction from the end of the pin to a gauge point of the connection. Upon application of the makeup torque, the separation between the load flanks distributes the torque forces between the makeup shoulders along the length of the engaged threads to prevent concentration of stress forces near the base of the pin thread. The progressive separation of the load flanks is achieved by progressively changing the pitch of the load flank of the pin and/or box thread to vary the thread width. The separation of load flanks is achieved without modifications of the stab flank pitch. The load flank pitch is reduced uniformly along the thread length to effectively achieve a different pitch per unit length. The amount of the load flank thread pitch reduction is equivalent to the makeup, for example, thirty degrees of four threads per unit length.

7 Claims, 3 Drawing Sheets

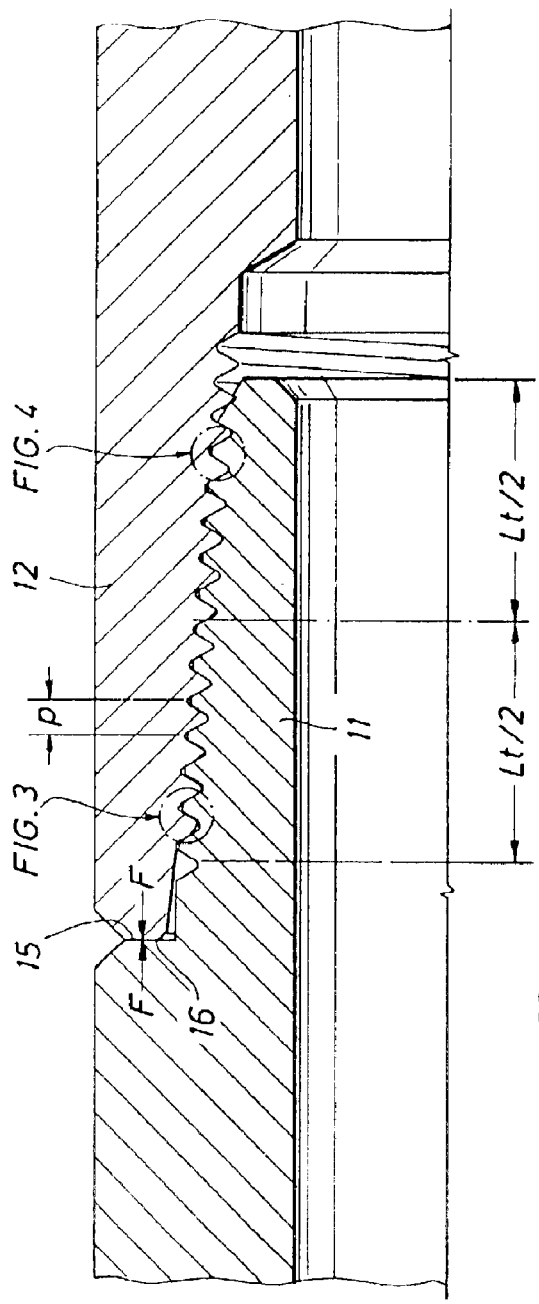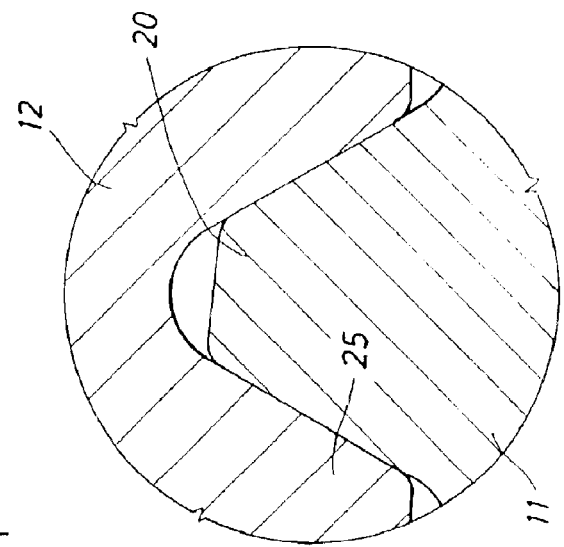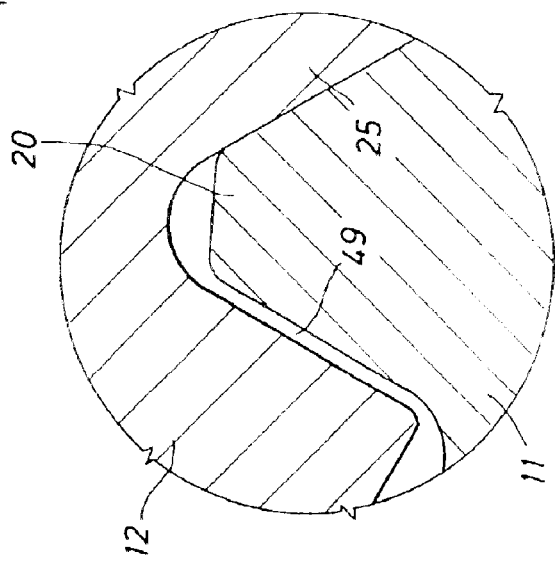

THREAD DESIGN FOR UNIFORM DISTRIBUTION OF MAKEUP FORCES

BACKGROUND OF THE INVENTION

1. Field of the Invention

The present invention relates generally to the connecting together of threaded components. More specifically, the present invention relates to the threaded engagement of tubular components that are used in the drilling and a completion of wells used in the production of hydrocarbons.

2. Prior Art Setting of the Invention

Typical oilfield pipe includes drill pipe, casing and tubing. Relatively short pipe sections of 30 to 40 ft. or so in length are secured to each other to make a long string of pipe that is used in the drilling or construction of a well. The drill pipe is used to form a drilling string to deepen or work over the well. The casing pipe is used to case the wellbore to provide structural support for the well. The tubing pipe may be used as a production tubing string to bring the subsurface oil or gas to the well surface.

Each of the different types of pipe has a threaded end configuration specially designed to meet its intended purpose as it structurally secures and seals the pipe ends together. A common threaded connection is one in which a pin, or male threaded member, at the end of a tubular section engages a box, or female tubular member, at the end of the adjoining tubular section. The box may be formed as an integral part of the tubular section or it may be formed by securing a coupling to a pin end of a tubular pipe section.

The threaded connections of oilfield tubulars generally engage each other in an interference fit, in a shouldering fit, or in a combination of interference and shouldering fit. In an interference fit, a tapered pin and box are tightly wedged together as the pin is threadedly advanced into the box. The interference fit provides both structural and sealing connection between the pin and box. A shouldering connection engages an annular shoulder on the pin with an annular shoulder in the box. The threads of the shouldering connection provide the structure holding the pin and box together. The engaged shoulders provide the seal.

Threaded connections of both the interference type and the shouldering type tend to fail in areas of stress concentrations that occur during makeup and working of the connections. Connections of the shouldering type induce stresses in the engaged pin and box threads as a result of the load occurring when the shoulders are torqued together. Shouldering drill pipe tool joint connections typically fail in the threaded area within one or two threads from the base of the pin threads, primarily as a result of the stress concentration applied to threads as a result of the shouldering torque.

A variety of thread designs has been suggested to change the distribution of shouldering torque stresses along the engaged thread area of the pin and box of drill pipe connections to minimize the tendency of the connections to fail in the area of the base of the pin threads. Many of these thread designs distribute the torque load along the engaged threads by spacing the threads of the pin and box so that the load flanks of the threads are differentially loaded along the area of thread engagement. A common way of achieving this effect is to vary the thread pitch of the engaged threaded components to change the distribution of forces along the axial length of the threaded engagement.

U.S. Pat. No. 4,549,754, belonging to the Assignee of the present invention, and incorporated herein in its entirety for all purposes, addresses the problem of concentrated stress in the threads near the base of the pin by decreasing the pin thread taper relative to the box thread taper to achieve the effect of a changing thread pitch. At the fully made-up position, the patented design causes threads remote from the torque shoulder to become loaded before threads nearer to the shoulder are loaded. The patent also describes a special thread construction to reduce maximum stress in the thread roots.

U.S. Pat. No. 3,050,318 describes a technique for the distribution of makeup forces in which the pitch of the threads of either the pin or box connection changes gradually over the length of the thread development. The pitch difference is greatest at the middle of the thread development.

U.S. Pat. No. 4,842,464, relating to a bolt and nut configuration, distributes the axial load forces of a made up connection by forming a nut thread that is slightly different than the thread of the screw. The nut has a non-uniform pitch that increases progressively helically and axially along the length of the nut. The screw thread retains a uniform pitch along its entire length.

While the described prior art designs are effective in changing the load distribution in the threaded area of the assembled members, they can be relatively difficult to fabricate, requiring variation of more than one variable in the pin or box configuration or thread structure.

BRIEF SUMMARY OF THE INVENTION

In a preferred form of the Invention, the load flank of the pin thread in a shouldering pin and box connection is machined such that the load flank of the furthest thread from the makeup shoulder on the pin has contact with the load flank of the box when the shoulders are just touching. The load flanks of the pin and box threads nearest the engaged shoulders do not touch and there is a maximum gap between them at this point. The spacing between the load flanks varies uniformly along the length of the engaged threads from the maximum gap to full contact. The spacing between thread load flanks distributes makeup and working stresses along the length of the engaged threads to prevent damaging stress concentrations in the pin.

The change in the gap length for each revolution of the pin thread is given by the following relationship:

$$dp(\text{avg}) = \frac{F \cdot p}{2 \cdot E} \left( \frac{1}{A(\text{pin})} + \frac{1}{A(\text{box})} \right)$$

where the components of the relationship are defined as:
A(box)=Cross sectional area of box at mean thread diameter;
A(pin)=Cross sectional area of pin at mean thread diameter;
dp(avg)=Average change in effective pitch of pin thread;
E=Modulus of elasticity of tool joint material;
F=Axial force on makeup shoulder of pin at full makeup torque; and
p=Nominal thread pitch.

The thread configuration of the pin, or box, or both, may be machined to achieve the desired stress distribution along the pin connection.

The preferred form of the Invention achieves the desired spacing between load flanks by appropriately machining only the pin thread of a shouldering pin and box connection. The pin is the preferred component for modification because of the comparative ease of machining the pin thread as compared with machining the box thread.

A feature of the present invention is that existing conventional connections may be modified to achieve the desired distribution of stresses in shouldering pin and box makeups. Thus, existing inventories of drill pipe and other shouldering connections may be modified in accordance with the teachings of the present invention by machining only the one member of the connection, preferably the pin.

From the foregoing, it will be appreciated that an object of the present invention is to provide a simple thread design for connecting together threaded tubulars that controls the distribution of forces existing along the length of the engaged threads.

A related object of the present invention is to provide a thread design for use in shouldering connections that distributes the makeup torque along the length of the engaged threads to reduce stress concentration in the threads adjacent the connection shoulders.

An important object of the present invention is to provide a thread design for use in a rotary shouldered drill pipe tool joint connection that distributes the makeup and working torque along the length of the engaged pin and box threads of the tool joint to reduce the stress concentration of forces in the first and second pin thread adjacent the pin shoulder.

Another important object of the present invention is to provide a thread for a shouldering pin and box connection that evenly distributes forces induced in the connection during makeup and working to enhance the durability and utility of the connection.

Yet another object of the present invention is to provide a method for modifying existing threads in a shouldering connection to improve the distribution of makeup and working stresses in the connection.

A general object of the present invention is to provide an improved shouldering connection by modifying the pin threads, box threads, or both pin and box threads, of the shouldering connection of a previously manufactured connection by modifying the threads to provide a gap in the connection between the load flanks of the pin and box threads at the point of initial shouldering during makeup of the connection and in which, at such point of initial shouldering, the gap decreases in size in a direction near the shouldering point of the connection toward the axial end of the pin of the connection.

The foregoing objects, features and advantages of the present invention will be more fully understood and better appreciated by reference to the following drawings, specification and claims.

BRIEF DESCRIPTION OF THE DRAWINGS

FIG. 2 of the drawings is a quarter sectional view of a 5"×2 7/16" NC38 tool joint with a variable thread pitch of the present invention;

FIG. 3 is an enlarged detailed view of the thread engagement of the tool joint of FIG. 2 within the circled area 3 of FIG. 2;

FIG. 4 is an enlarged detailed view of the thread engagement of the tool joint of FIG. 2 adjacent the pin nose in the circled area 4 of FIG. 2;

DESCRIPTION OF THE ILLUSTRATED EMBODIMENT

Figure 1:
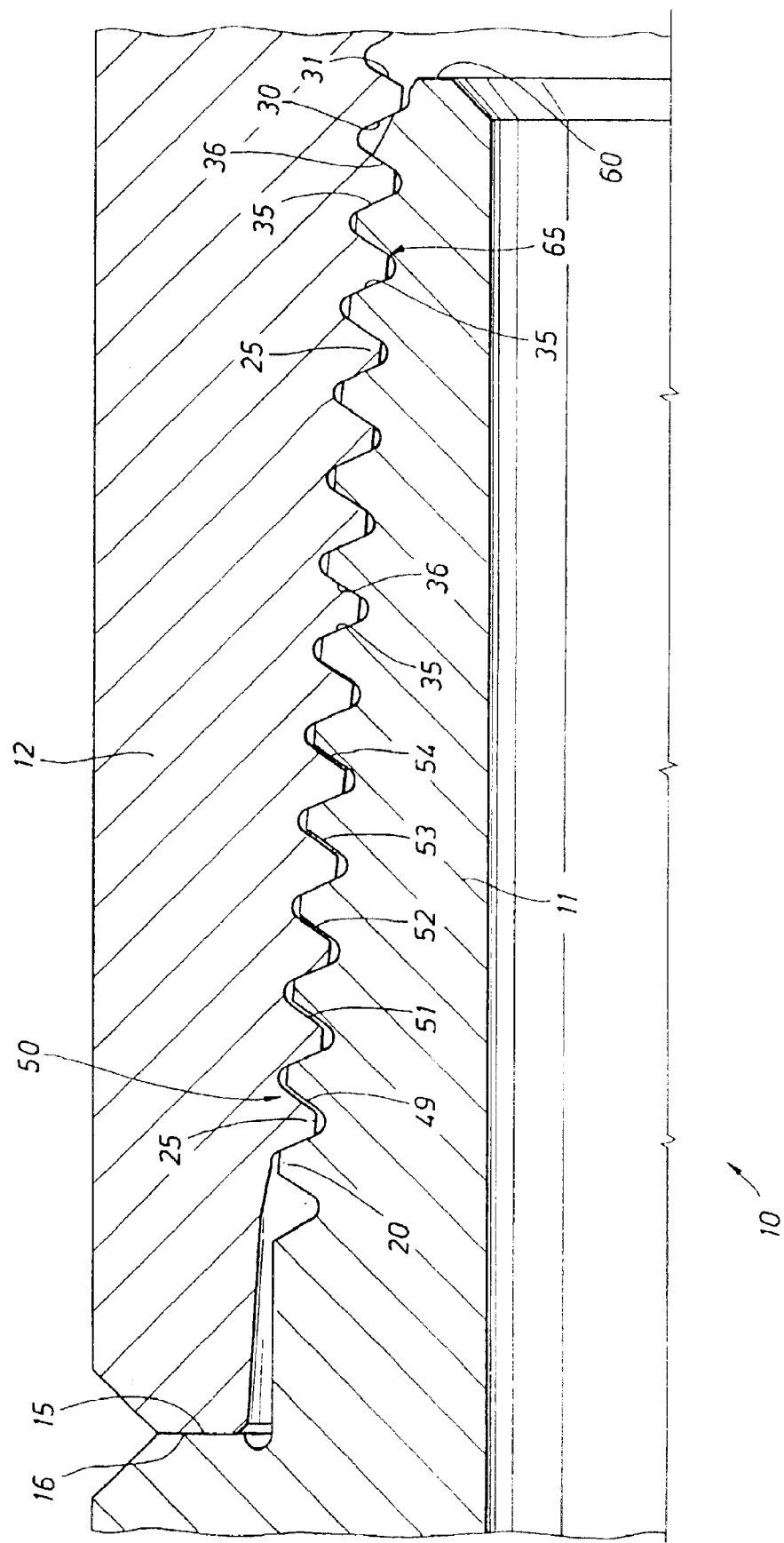
FIG. 1 of the drawings is a quarter-sectional view of an engaged threaded pin and box tool joint connection illustrating the thread design of the present invention.

FIG. 1 illustrates a tool joint pin and box connection of the present invention indicated generally at 10. The connection 10 comprises a pin 11 and a box 12. The pin 11 includes an external shoulder 15 that engages the end or face 16 of the box 12. The face 16 functions as a box shoulder engaging the external pin shoulder 15.

The pin 11 is equipped with a helically extending external pin thread tooth 20 that engages and mates with a helically extending internal box thread tooth 25. The box thread 25 includes a stab flank 30 and a load flank 31. The pin thread 20 similarly includes a stab flank 35 and a load flank 36.

As used herein, the term "stab flank" is intended to designate those flanks of the pin and box threads that first engage as the pin is stabbed into the box and the term "load flank" is intended to designate those contacting flanks of the pin and box threads that normally contact with an increasing bearing pressure in reaction to the load forces tending to separate the engaged pin and box axially.

FIG. 1 illustrates a gap 50 between the last full turn of the pin and box thread nearest the shoulders 15 and 16. The gap 50 is followed by succeedingly smaller gaps 51, 52, 53, and 54 between succeeding turns of the thread teeth of the pin and box. Although not visible in the drawings, any gap between succeeding turns of the pin and box threads continues to diminish and the interference increases between engaged threads after the gap closes in a direction from the engaged shoulders 15 and 16 toward the axial end 60 of the pin 11. As torque is applied to the pin and box connection 10, following engagement of the shoulder 15 and 16, the pin 11 is drawn into tension and the box 12 is pulled into compression.

Sufficient torque is applied to provide a preload bearing pressure between the shoulders 15 and 16 to seal the connection to pressure within the connection 10 when the connection is in tension during drilling or other well operations. Because of the thread design of the present invention, the stresses exerted along the length of the engaged threads 20 and 25 are distributed to enhance the life of the connection.

The taper, thread pitch, pitch diameter, thread profile and all other dimensions and configurations of the box 12 are in accordance with the specifications of the American Petroleum Institute (API) for a rotary shouldered drill pipe tool joint. As used herein, references made to a standard dimension or component are intended to refer to the dimension or component as defined in the specifications established for the industry by the API.

With the exception of the load flank of the pin thread tooth 20, the pin threads of the pin 11 are machined in accordance with the API requirements for a rotary-shouldered tool joint pin.

In the manufacture of the pin of the present invention, the pin is machined so that the load flank 36 of the furthest thread from the makeup shoulder 15 on the pin 11 has contact with the load flank 31 of the box thread 25 when the makeup shoulders 15 and 16 are just touching. The load flanks of the pin and box threads nearest the engaged makeup shoulders 15 and 16 do not touch and there is a gap 49, having a maximum width indicated at 50, between the pin and box thread teeth. The axial distance between the load flanks along the helical length of the thread teeth 20 and 25 varies from a maximum gap 50 such as at 51 to full contact such as indicated at 65.

The change in the gap width 49 between the pin and box thread teeth for each revolution of the pin thread tooth is given by the following relationship:

$$dp(\text{avg}) = \frac{F \cdot p}{2 \cdot E}\left(\frac{1}{A(\text{pin})} + \frac{1}{A(\text{box})}\right)$$

where the components of the relationship are defined as:
A(box)=Cross sectional area of box at mean thread diameter;
A(pin)=Cross sectional area of pin at mean thread diameter;
dp(avg)=Average change in effective pitch of pin thread;
E=Modulus of elasticity of tool joint material;
F=Axial force on makeup shoulder of pin at full makeup torque; and
p=Nominal thread pitch.

FIG. 2 illustrates a 5"×2⁷⁄₁₆" NC38 tool joint, manufactured in accordance with the teachings of the present invention. For a 5"×2⁷⁄₁₆" NC38 tool joint, the change in the gap width between the pin 20 and box 25 threads for each revolution of the pin thread tooth 20 can be calculated using the following formula:

$$dp(\text{avg}) = \frac{F \cdot p}{2 \cdot E}\left(\frac{1}{A(\text{pin})} + \frac{1}{A(\text{box})}\right)$$

where the foregoing components are marked on FIG. 2 and defined as:
A(pin)=4.342 sq. in. Cross sectional area of pin at mean thread diameter;
A(box)=9.075 sq. in. Cross sectional area of box at mean thread diameter;
E=30,000,000 psi Modulus of elasticity of tool joint material;
F=416,220 lbs. Axial force on makeup shoulder at makeup torque;
p=0.250 in. Nominal thread pitch;
Lt=3.375 in. Thread length;
dp(avg)=0.000591 in. Average change in effective pitch of box thread.

The gap width 49 illustrated in FIG. 3 between the pin and box thread load flanks nearest the makeup shoulder is 0.0065 in. The gap is closed in FIG. 4. The interference between engaged teeth may be appreciated as increasing in a direction from the pin shoulder toward the pin nose.

Figure 5:
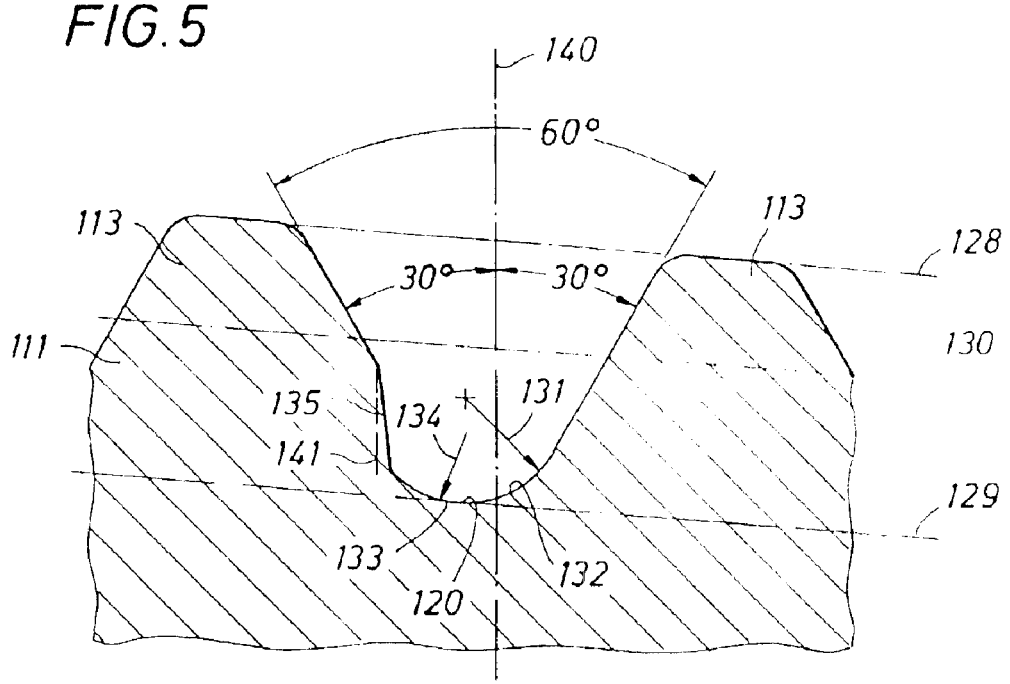
FIG. 5 is a cross sectional view of an enlarged radius root that may be advantageously used in a thread design of the present invention.
Figure 6:
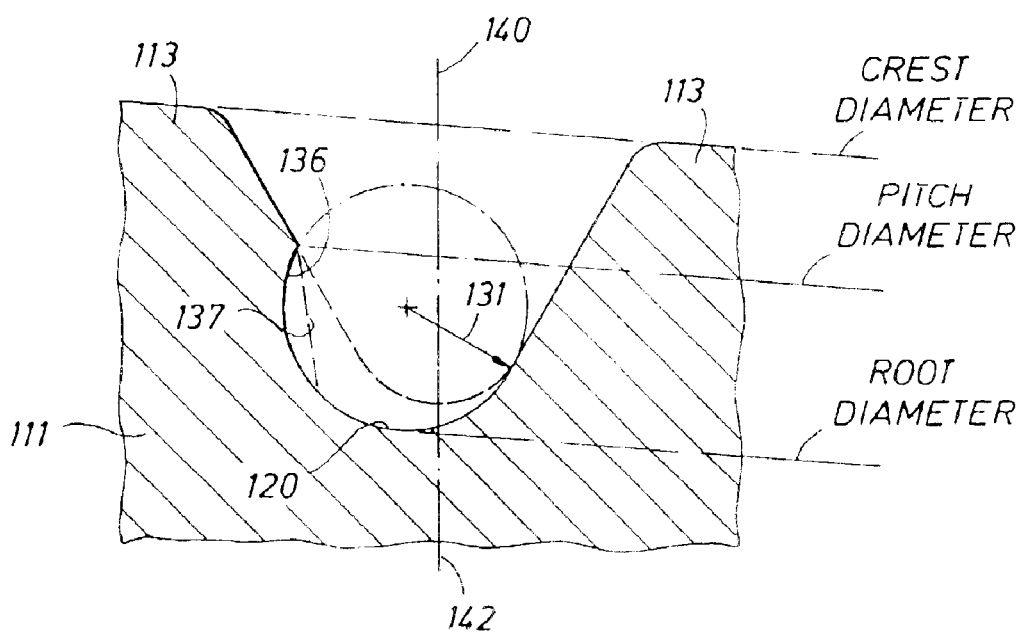
FIG. 6 is a cross sectional view of a modified form of an enlarged thread root for use with the thread design of the present invention.

Specific thread root forms that may be desirably used with the variable load distribution design of the present invention are illustrated in FIGS. 5 and 6 of the drawings. The thread root forms of FIGS. 5 and 6 are more fully described in U.S. Pat. No. 4,549,754. The crest diameter is illustrated at 128, the root diameter is indicated at 129, and the pitch diameter is indicated at 130.

FIG. 5 of the Drawings illustrates a modified thread structure on a pin member 11 having a root radius indicated by an arrow 131 at a root 120 of the pin thread 113. The root radius 131 is increased approximately 50 percent over that of a typical, standard API thread. For example, in a typical, standard API thread having 4 threads per inch and 2 in. taper per foot the root radius 131 may be 0.038 in. The root radius in the modified thread structure illustrate in FIG. 5 is preferably 0.05 7 in. This enlarged and gentler curve 132 in the root portion 120 may continue or may blend smoothly into another curve 133 of substantially shorter radius 134. In this case, radius 131, which is a 0.057 in., blends into radius 134, which is 0.032 in. The thread flanks form a 60 degree angle bisected by a centerline 140 to form two angles of 30 degrees each.

The shorter radius curve or the single radius curve 133 is terminated at a flat surface 135 that diverges outwardly at an angle of about 5 degrees from a plane normal to the thread axis to a point where it engages or intersects the normally sloping wall of the unloaded thread. Thus, the radius preferably does not extend beyond a plane 141 (FIG. 5) parallel to the thread centerline and passing through the unloaded flank on the root side of the pitch diameter of he unloaded flank. To provide for wear of tools, the surface 135 between the root and loaded flank preferably diverges outwardly at about a 5 degree angle to the thread centerline.

In conventional API threads, the thread root is truncated by providing a root radius equal to the distance between the root diameter and a point representing the intersection of the planes of the opposing flanks of the adjoining thread teeth. The selected root radius and root truncation of an API thread are equal and the center of the root radius lies on the thread centerline.

The thread form illustrated in FIG. 5 provides a root radius 131 that is greater, and preferably substantially greater, than the root truncation. To provide that the load flank be tangent to the root radius, the center of the radius will lie on the unloaded flank side of the thread centerline. Any increase of the root radius over root truncation will result in a decrease in maximum stress. This larger root radius should extend to at least the thread centerline 140 and preferably extend to the root diameter 129 of the thread as illustrated in FIG. 5. The pitch diameter line is illustrated at 130.

The root radius may not be increased to the extent that it reduces the distance from the root of the thread to the bore of the tool joint substantially since this will result in a substantial weakening of the tool joint from the loss of metal. Using the criteria of this thread form, no more than a ten percent reduction in pin cross-section under the last engaged thread will result. Also, the root radius should not be increased to a point that is greater than a distance that would intersect or exceed the pitch diameter. This condition is shown in FIG. 6 and represents the limiting condition of enlargement of root diameter.

The limit of engaged root diameter, which is shown in FIG. 6, is difficult to use in practice since it would tend to produce an undercut area 136 that would make it difficult to use standard cutting tools that move in a plane normal to the thread axis. It would be possible to use this limit of radius with standard tools if the undercut area were eliminated and a flat surface introduced, as indicated by the dotted line 137.

It should be noted that one-half the distance along a line extending normally to t e load flank and passing through the pitch diameter at the unloaded flank is considered to be the limit of increase in root radius since a further increase in root radius would change the thread configuration above the pitch diameter and thus make the threads incompatible with a standard API box thread. The pitch diameter represents the depth of penetration of the standard API thread gauge and as long as the thread configuration above the pitch diameter matches an API gauge, the thread will mate with a standard API box thread. Also, the original thread shear area (base width of the thread form) preferably is not reduced by more than 25%. Joining the unloaded flank to the thread root by the surface 135 will accomplish this objective. The modification of the thread below the pitch diameter line has the effect of reducing stress concentration in the thread root 120 without interfering with the thread fit with the standard API box thread.

The thread configuration of FIGS. 5 and 6 may be used at any point along the pin threads. It will be appreciated that the thread root configuration illustrated in FIGS. 5 and 6 applied to a conventional API pin provides a tapered pin member having an external V-configuration truncated standard thread. The standard thread is formed with at least its last thread away from the end of the pin provided with a root cut on a radius that is greater than the truncation of the standard API thread root and less than one-half the distance along a line extending perpendicular from the load flank to the pitch diameter of the opposed unloaded flank. The load flank is tangent to the root at their point of juncture and the root radius terminates on the unloaded flank side of the thread centerline and short of a plane parallel to the thread centerline and passing through the unloaded flank pitch diameter. The termination of the root radius is connected to the unloaded flank by a surface diverging outwardly from a plane to the termination of the root radius and parallel to the thread centerline.

Various additional modifications to the threaded connection described herein will be apparent from the foregoing description of the preferred embodiments. Although the invention has been described in detail for such embodiments, it will be understood that this explanation is for illustration, and that the invention is not limited to the specifically described embodiments. Alternative structure and operating techniques will be apparent to those skilled in the art in view of the foregoing disclosure. Modifications are thus contemplated and may be made without departing from the spirit of the invention, which is defined by the following claims.

What is claimed is:

1. A connection for a threaded pin and box constructed of a material having a modulus of elasticity "E" and having makeup shoulders that contact when threads of the pin and box are fully engaged, comprising:

a pin thread having a load flank and a stab flank wherein axial force on said load flank is increased as axial force "F" on said makeup shoulders increases, said pin having a cross sectional area of "A(pin)" at a mean thread diameter of said pin, a box thread having a cross sectional area of "A(box)" at a mean thread diameter of said box, a nominal thread pitch "p" for said box thread and said pin thread, and an average change in effective pitch "dp(avg)" over at least a portion of said pin thread of:

$$dp(\text{avg}) = \frac{F \cdot p}{2 \cdot E}\left(\frac{1}{A(\text{pin})} + \frac{1}{A(\text{box})}\right).$$

2. A connection as defined in claim 1 wherein said pin further comprises:

a tapered pin member having an external V-configuration truncated thread, said thread having at least its last thread away from the end of the pin provided with a root cut on a radius that is greater than the truncation of the thread root and less than one-half the distance along a line extending perpendicular from the load flank to the pitch diameter of the opposed unloaded flank, and said load flank being tangent to said root at their point of juncture, said root radius terminating on the unloaded flank side of the thread centerline and short of a plane parallel to the thread centerline and passing through the unloaded flank pitch diameter, and said termination of said root radius being connected to the unloaded flank by a surface diverging outwardly from a plane to said termination of said root radius and parallel to said thread centerline.

3. A connection as defined in claim 1 wherein said pin further comprises:

a tapered pin member having an external V-configuration truncated thread with its root cut on a radius that is greater than the truncation of the thread root and less than one-half the distance along a line extending perpendicular from the load flank to the pitch diameter of the opposing unloaded flank, and said load flank being tangent to said root at their point of juncture.

4. A connection as defined in claim 1, wherein said pin further comprises:

a tapered pin member having an external V-configuration truncated thread having at least one complete thread provided with a root cut on a radius that is greater than the truncation of the thread root and less than one-half the distance along a line extending perpendicular from the load flank to the pitch diameter of the opposing unloaded flank, and said load flank the tangent to said root at their point of juncture.

5. A connection as defined in claim 1, wherein said pin further comprises:

a tapered pin member having an external V-configuration truncated thread, said thread having at least its last thread away from the end of the pin provided with a root cut on a radius that is greater than the truncation of the thread root and less than one-half the distance along a line extending perpendicular from the load flank to the pitch diameter of the opposed unloaded flank, and said load flank being tangent to said root at their point of juncture, said root radius terminating on the unloaded flank side of the thread centerline and short of a plane parallel to the thread centerline and passing through the unloaded flank pitch diameter, and said termination of said root radius being connected to the unloaded flank by a surface diverging outwardly from a plane to said termination of said root radius and parallel to said thread centerline.

6. A connection as defined in claim 1 wherein said pin further comprises:

a tapered pin member having an external V-configuration truncated thread with its root cut on a radius that is greater than the truncation of the thread root and less than one-half the distance along a line extending perpendicular from the load flank to the pitch diameter of the opposing unloaded flank, and said load flank being tangent to said root at their point of juncture.

7. A connection as defined in claim 1, wherein said pin further comprises:

a tapered pin member having an external V-configuration truncated thread having at least one complete thread provided with a root cut on a radius that is greater than the truncation of the thread root and less than one-half the distance along a line extending perpendicular from the load flank to the pitch diameter of the opposing unloaded flank, and said load flank the tangent to said root at their point of juncture.

* * * * *